(12) United States Patent
Beaumont et al.

(10) Patent No.: US 9,921,805 B2
(45) Date of Patent: Mar. 20, 2018

(54) MULTI-MODAL DISAMBIGUATION OF VOICE ASSISTED INPUT

(71) Applicant: Lenovo (Singapore) Pte. Ltd., Singapore (SG)

(72) Inventors: Suzanne Marion Beaumont, Wake Forest, NC (US); Rod D. Waltermann, Rougemont, NC (US); Antoine Roland Raux, Cupertino, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 328 days.

(21) Appl. No.: 14/741,569

(22) Filed: Jun. 17, 2015

(65) Prior Publication Data

US 2016/0371054 A1 Dec. 22, 2016

(51) Int. Cl.
G06F 3/16 (2006.01)
G06F 3/01 (2006.01)

(52) U.S. Cl.
CPC .............. *G06F 3/167* (2013.01); *G06F 3/013* (2013.01); *G06F 3/017* (2013.01); *G06F 2203/0381* (2013.01)

(58) Field of Classification Search
CPC ....................................................... G06F 3/167
USPC ............................................................ 715/728
See application file for complete search history.

(56) References Cited

U.S. PATENT DOCUMENTS

| | | | |
|---|---|---|---|
| 7,650,284 B2* | 1/2010 | Cross ...................... G10L 15/26 | 704/270 |
| 8,381,107 B2* | 2/2013 | Rottler .................. G06F 3/0482 | 715/716 |
| 8,725,513 B2* | 5/2014 | Cross, Jr. ................ G10L 15/22 | 379/88.01 |
| 8,862,475 B2* | 10/2014 | Ativanichayaphong ............................. G10L 15/265 | 704/270 |
| 9,304,736 B1* | 4/2016 | Whiteley ......... G06Q 20/40145 | |
| 9,330,497 B2* | 5/2016 | Byrd ..................... G06T 19/003 | |
| 2004/0025115 A1* | 2/2004 | Sienel ............... G06F 17/30896 | 715/234 |
| 2005/0027538 A1* | 2/2005 | Halonen ........... H04M 1/72561 | 704/275 |
| 2008/0092041 A1* | 4/2008 | Mathews .................. G06F 8/34 | 715/700 |
| 2008/0208590 A1* | 8/2008 | Cross ...................... G10L 15/22 | 704/275 |
| 2008/0255851 A1* | 10/2008 | Ativanichayaphong ............................. G10L 15/265 | 704/275 |
| 2009/0013255 A1* | 1/2009 | Yuschik .................. G06F 3/038 | 715/728 |
| 2010/0031151 A1* | 2/2010 | Cross ..................... G06F 3/167 | 715/728 |
| 2010/0332234 A1* | 12/2010 | Agapi ..................... G10L 15/22 | 704/275 |

(Continued)

*Primary Examiner* — William Titcomb

(74) *Attorney, Agent, or Firm* — Ference & Associates LLC

(57) ABSTRACT

One embodiment provides a method, including: receiving, at an audio receiver of a device, a voice input; selecting, using a processor of a device, an active target voice enabled resource for the voice input from among a plurality of active target voice enabled resources; and providing, using a processor of the device, the voice input to the active target voice enabled resource selected. Other aspects are described and claimed.

20 Claims, 3 Drawing Sheets

(56) References Cited

U.S. PATENT DOCUMENTS

| | | | |
|---|---|---|---|
| 2011/0010180 A1* | 1/2011 | Agapi | G06F 17/30861 |
| | | | 704/275 |
| 2011/0032845 A1* | 2/2011 | Agapi | H04L 12/413 |
| | | | 370/260 |
| 2013/0041243 A1* | 2/2013 | Byrd | G06T 19/003 |
| | | | 600/374 |
| 2013/0090931 A1* | 4/2013 | Ghovanloo | G06F 3/011 |
| | | | 704/275 |
| 2013/0339030 A1* | 12/2013 | Ehsani | G10L 17/005 |
| | | | 704/275 |
| 2014/0184550 A1* | 7/2014 | Hennessey | G06F 3/013 |
| | | | 345/173 |
| 2014/0208210 A1* | 7/2014 | Cross, Jr. | G10L 15/22 |
| | | | 715/728 |
| 2015/0019227 A1* | 1/2015 | Anandarajah | G10L 15/22 |
| | | | 704/257 |

* cited by examiner

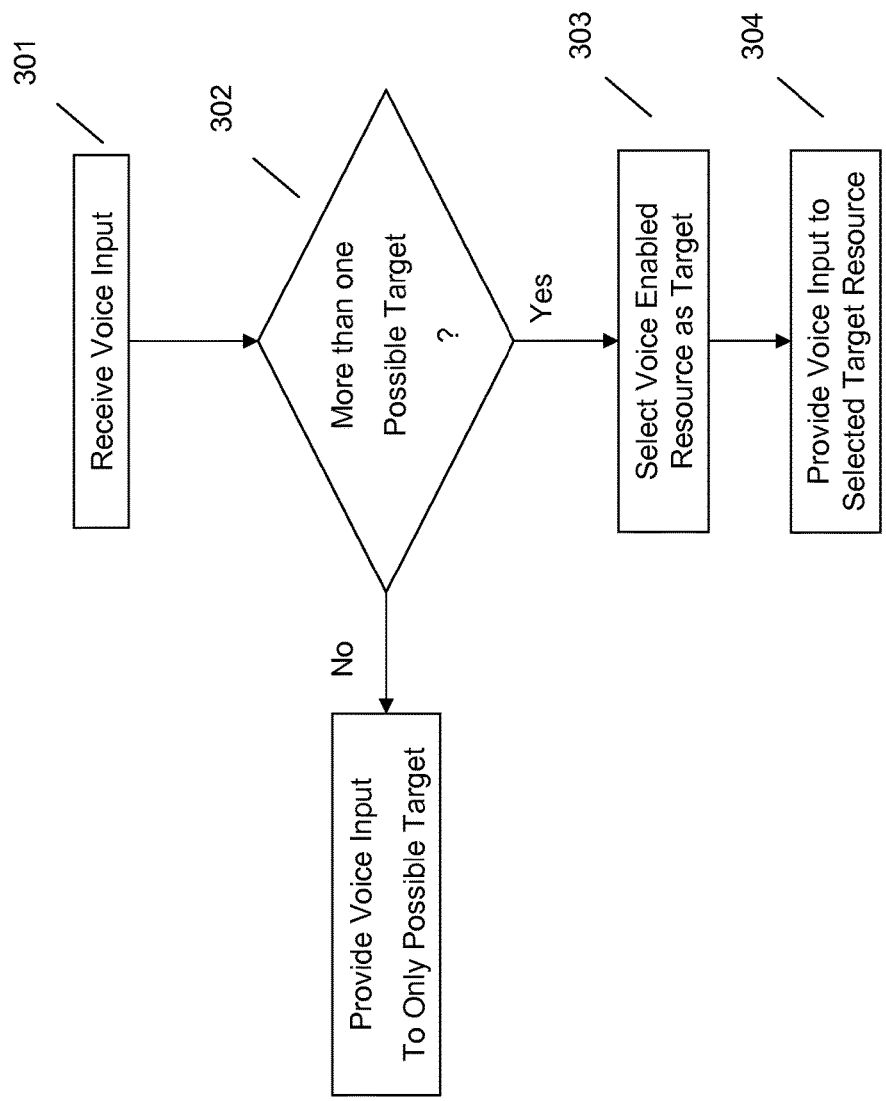

MULTI-MODAL DISAMBIGUATION OF VOICE ASSISTED INPUT

BACKGROUND

Electronic devices (e.g., tablet devices, smart phones, smart watches, laptop computers, personal computers, etc.) allow users to provide voice inputs, for example, voice commands, voiced text entries and the like. Conventionally, upon entry of voice input into a currently active application (e.g., virtual assistant application, speech to text application, etc.) the voice input is processed to identify words for text input or for commands, depending on the currently active application. In some cases, multiple voice enabled tasks coincide and it is difficult for the system to determine an appropriate target application for the voice input. Such voice inputs are conventionally dealt with serially, e.g., a user must manually switch from a currently active voice enabled application to another voice enabled application.

BRIEF SUMMARY

In summary, one aspect provides a method, comprising: receiving, at an audio receiver of a device, a voice input; selecting, using a processor of a device, an active target voice enabled resource for the voice input from among a plurality of active target voice enabled resources; and providing, using a processor of the device, the voice input to the active target voice enabled resource selected.

Another aspect provides an electronic device, comprising: an audio receiver; a display device; a processor operatively coupled to the audio receiver and the display device; and a memory that stores instructions executable by the processor to: receive, at the audio receiver, a voice input; select an active target voice enabled resource for the voice input from among a plurality of active target voice enabled resources; and provide the voice input to the active target voice enabled resource selected.

A further aspect provides a product, comprising: a storage device that stores code executable by a processor, the code comprising: code that receives, from an audio receiver of a device, a voice input; code that selects an active target voice enabled resource for the voice input from among a plurality of active target voice enabled resources; and code that provides the voice input to the active target voice enabled resource selected.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method of multi-modal disambiguation of voice assisted text entry.

DETAILED DESCRIPTION

Figure 1:
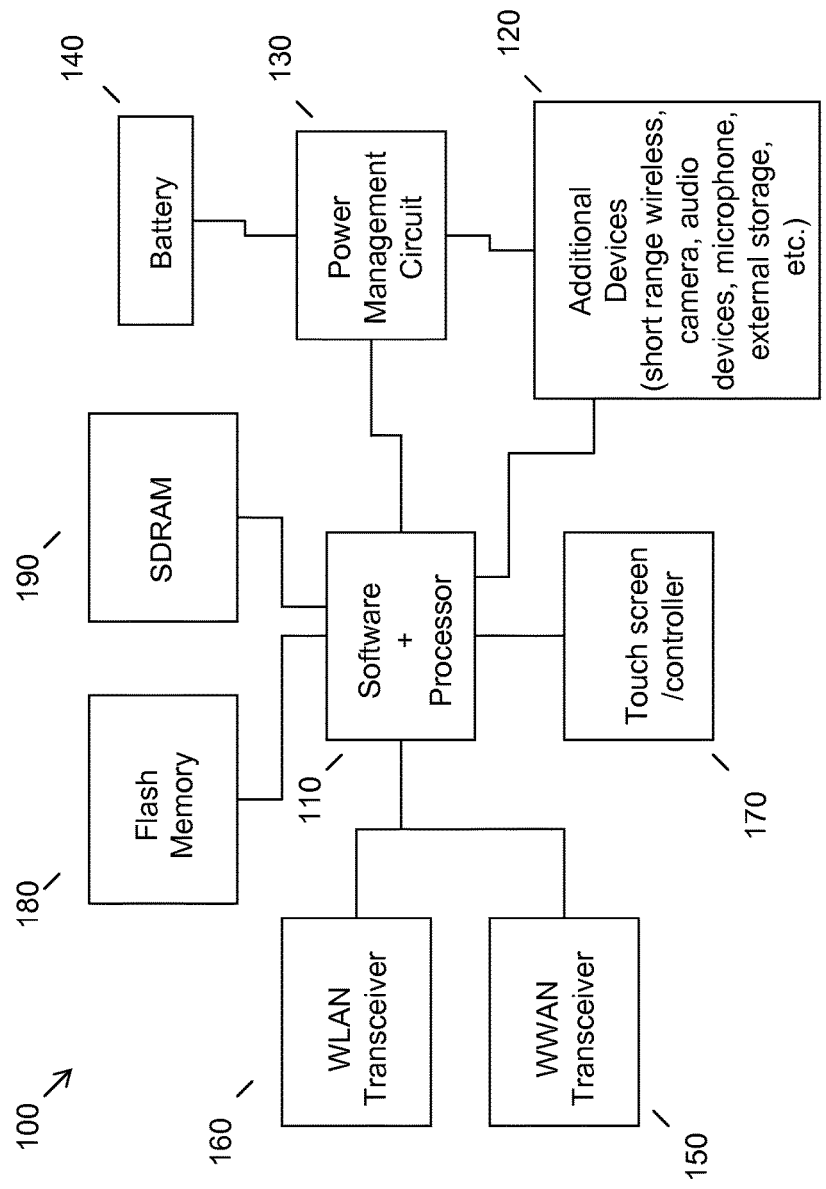
FIG. 1 illustrates an example of electronic device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described herein, if multiple voice enabled tasks coincide, it is difficult for the system to determine an appropriate target for voice input. Voice enabled tasks conventionally are dealt with serially rather than in parallel. This is largely because voice enabled applications lack an ability to coordinate voice inputs, requiring the user to manually switch between available voice enabled applications.

Accordingly, an embodiment permits multiple voice-enabled applications or programs to operate in parallel. In an embodiment, use of multi-modal inputs is leveraged to achieve a coordinated handling of voice inputs such that different voice inputs are directed to an appropriate application or task. An embodiment may select an active target resource, e.g., application, device, etc. That is, an embodiment may select an active target device, an active target application, a particular sub-system, or may select a combination of the foregoing for routing of the voice input. Throughout the description, examples are given with reference to voice-enabled applications. However, an embodiment may target different resources, e.g., application(s), device(s), sub-system(s), etc. for routing of the voice input, in whole or in part.

For example, for a voice assisted text entry application that is active at the same time as a voice-to-text messaging application, if a user is entering text into the voice assisted text entry application and a notification from a messaging application pops up, the user may wish to speak the response to the notification. Conventionally, the user is forced to explicitly switch out of the voice assisted text entry application and enter the voice-to-text messaging application in order to voice a response to the notification or message.

However, through multiple mechanisms, an embodiment allows the user to select the target voice enabled application for the spoken text. Example mechanisms allowing the user to target the voice input to the correct application include but are not limited to eye tracking, gesture, situational and contextual data, or even touch input. Use of trigger words or phrases may also be employed. However, trigger words, touch input, or other like mechanisms do not force a switch between active voice enabled applications. Rather, these mechanisms permit targeting of voice input and do not require the user to switch on application off, explicitly activate another, etc. Rather, the initial application, e.g., the voice assisted text entry application in the example above, will not be provided with the voice input for response to the voice-to-text messaging application. Instead, the second application, e.g., the voice-to-text messaging application will have the voice input diverted to it, and the first application remains active and listens for additional audio for entry into the voice assisted text entry application.

By way of example, the user may shift his or her view from an entry pane or area with the voice assisted text entry application to the notification pane or area provided in the pop up from the voice-to-text messaging application, speak a response to the notification, and then return attention back to the entry pane or area. Using an eye tracking sub-system, an embodiment switches the voice input audio from the user to the voice-to-text messaging application and diverts this input from being given to the voice assisted text entry application. Thus, the original application remains active and the user may target voice input to the alternate application momentarily, with minimal effort.

Alternatively, the user may shift his or her view from the entry area or pane to the notification area or pane, touch the notification area or pane, speak a response, and then return attention back to the typing pane. An embodiment may thus use more than one additional input (in this example, touch input and eye tracking input) to increase the confidence of the voice input targeting.

An embodiment may use other types or modes of input to target the voice input to the appropriate application or task. For example, a user may provide a gesture input captured by a camera, e.g., holding a hand up to gesture "stop" to the entry pane or area of the voice assisted text entry application, and shift his or her view to the notification pane or area to speak a response to the notification. Thereafter, the user may return his or her view to the entry pane, optionally augmenting this move with another gesture.

Situational and contextual awareness may be implemented by using data that indicates a predetermined situation or context of voice input. For example, discontinuities in a flow of words or actions may act as a predetermined pattern of input that is associated with context shifting, e.g., shifting the target application to which voice input data should be routed. Returning to the aforementioned example, the user may interrupt dictation of a message mid sentence, e.g., with a very different words or phase (such as "close that!") whose target is intended to be a different voice enabled program, application or task (e.g., a voice-enabled application issuing the notification popup). Discontinuities could be subtle indicators, like stumbles or sudden pauses that represent a greater probability that focus is changing, which again may be coupled with additional data promoting a situational awareness, for example knowledge of what is in focus on the screen at the moment the user says something. By monitoring for such data, an embodiment may increase the probability or confidence of correctly identifying a target for the spoken input.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an audio receiver such as a microphone that operates with a speech processing system for providing voice input and related data, as further described herein, a camera that captures image data that operates with a gesture recognition engine, etc. System 100 often includes a touch screen 170 for data input and display/rendering. System 100 also typically includes various memory devices, for example flash memory 180 and SDRAM 190.

Figure 2:
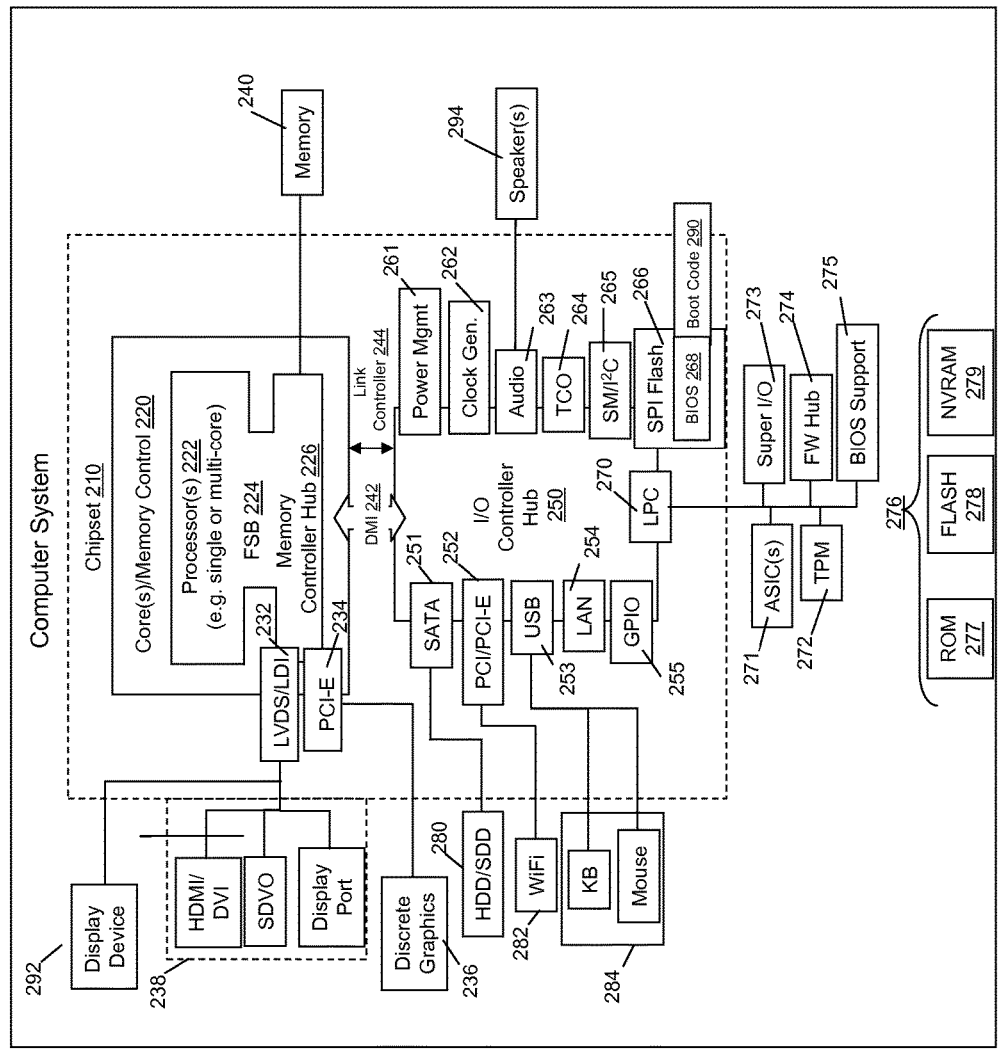
FIG. 2 illustrates another example of electronic device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, laptop or other personal computing devices generally, and/or other electronic devices to which users may provide voice input to various voice enabled applications. Examples of voice enabled applications include text-to-speech applications or voice assisted applications generally, with specific examples being voice input assisted applications such as a note taking or word processing application, voice command enabled applications such as virtual assistants or navigation applications, or applications that support voice inputs thereto as provided by other applications.

Referring generally to FIG. 3, an embodiment assists a user by implementing a mechanism that targets voice input to an appropriate voice enabled application. For example, on receiving a voice input at 301, e.g., at an audio receiver such as a microphone of a smart phone or tablet computing device, an embodiment determines at 302 that more than one active target resource, e.g., voice enabled application, might receive and act on the voice input. If no other voice enabled application is active or available, the voice input may of course be routed to the only possible destination. Otherwise, an embodiment may need to select the appropriate voice enabled application to which the voice input is targeted.

For example, the user may be providing voice input to a voice assisted note taking application when a notification of an incoming text message is received. In order to respond, the user may voice input and intend that the input be provided to the messaging application rather than the note taking application. Thus, an embodiment determines at 302 that a voice input, e.g., "close that" received at 301 while the note taking application and messaging application are both able to use the voice input, is to be targeted to one of the voice enabled applications.

In a conventional device, a user would be forced to switch out of the note taking application, activate the messaging application, and then provide the voice input "close that" in order to avoid the voice input "close that" from being transcribed into the note being composed by the note taking application. In order to streamline this process, an embodiment includes a processing capability where multi-modal inputs are used to disambiguate the potential targets and select an appropriate target application.

For example, an embodiment may select at 303 an active target voice enabled application for the voice input using a variety of additional data sources or processing techniques that permit situational or contextual awareness. By way of example, an additional data source such as input data from an eye tracking system may be used to determine where on the display the user is looking while providing the voice input. If this area of the display device coincides with a displayed messaging application notification, an embodiment may select that application as the appropriate target application.

As another example, an additional data source such as input from a camera and gesture recognition system may be used to determine if the user performs a predetermined gesture while providing the voice input. For example, a predetermined hand gesture may be used to conveniently target the voice input to one application or another.

As another example, data from a touch screen display may be used to determine where the user touched the display screen when providing the voice input. These additional data inputs, from alternate (i.e., non-voice channels), may be used by an embodiment in selecting a target application at 303.

An embodiment may also apply additional processing, e.g., on the voice input itself, in order to select an appropriate target application at 303. For example, an embodiment may analyze the word(s) used in the voice input to determine if the note taking application or the messaging application is the appropriate target application for the voice input. As will be appreciated from the foregoing, more than one technique may be applied in order to increase the confidence of the selecting at 303.

Once a target voice enabled application is selected at 303, an embodiment provides at 304 the voice input to the active target voice enabled application selected. Thus, the voice input is sent to one of the applications from the potential target voice enabled applications. In an embodiment, the voice data may be buffered temporarily while the selecting step is completed at 303, and thereafter sent to the appropriate application at 304, thus precluding the voice input from reaching an incorrect application.

By way of specific example, the selecting at 303 may include obtaining additional input such as eye tracking input. This eye tracking input may be obtained while the user provides the voice input and allows an embodiment to determine that the voice input, e.g., "close that," is provided while the user is focusing on a notification displayed by the messaging application. Thus, an embodiment may select at 303 the messaging application and provide the buffered voice data (or text or other output derived from the voice data or processing thereof) to the messaging application. The note taking application may continue to listen for additional voice input, i.e., it need not be closed or deactivated in order to route the voice input data to the messaging application.

As described, herein, many additional data sources, e.g., gesture input, touch input and/or voice input may be used alone or in combination to facilitate the selecting at 303. In an embodiment, the selecting at 303 comprises analyzing one or more words of the voice input, with additional analysis of previous voice input, e.g., to determine if the words of the voice input appear out of context to previously entered words in the note taking application. This may be combined with another mode of input, e.g., eye tracking data or gesture data, to increase the confidence of the analysis that determines the words of the voice input are out of context for the note taking application. Therefore, if the voice input contains words that are determined to be out of context for an active voice input application with a lower probability or confidence, this probability or confidence may be increased by analyzing eye tracking or gesture data, e.g., the user's gaze is focused on a notification from a messaging application when the out of context voice input is received.

An embodiment therefore represents a technical improvement in providing mechanisms by which received voice inputs may be appropriately routed to voice enabled applications. In addition to reducing the time and complexity of conventional techniques, an embodiment tends to facilitate adoption of voice input as a mode of interfacing with the device because users are no longer burdened with making selections of which application should be considered active and receive the voice input.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an audio receiver of a device, a voice input;
   selecting, using a processor of a device, an active target voice enabled resource for the voice input from among a plurality of active target voice enabled resources, wherein each of the plurality of active target voice enabled resources is associated with a voice enabled application and wherein the selecting comprises using contextual data to determine the active target voice enabled resource; and
   providing, using a processor of the device, the voice input to the active target voice enabled resource selected.

2. The method of claim 1, wherein the active target voice enabled resource is selected from the group consisting of an active target voice enabled application and a voice enabled device associated with a voice enabled application.

3. The method of claim 1, further comprising obtaining additional input, wherein the selecting comprises utilizing the additional input.

4. The method of claim 3, wherein the additional input comprises eye tracking input.

5. The method of claim 4, wherein the eye tracking input is associated with a predetermined area.

6. The method of claim 5, wherein the predetermined area comprises a display area used by one of the plurality of active target voice enabled resources.

7. The method of claim 6, wherein the display area includes a notification issued by the one of the plurality of active target voice enabled resources.

8. The method of claim 3, wherein the additional input is selected from the group consisting of gesture input, touch input and voice input.

9. The method of claim 1, wherein the selecting comprises analyzing one or more words of the voice input.

10. The method of claim 9, wherein the analyzing comprises analysis of previous voice input.

11. An electronic device, comprising:
an audio receiver;
a display device;
a processor operatively coupled to the audio receiver and the display device; and
a memory that stores instructions executable by the processor to:
receive, at the audio receiver, a voice input;
select an active target voice enabled resource for the voice input from among a plurality of active target voice enabled resources, wherein each of the plurality of active target voice enabled resources is associated with a voice enabled application and wherein to select comprises using contextual data to determine the active target voice enabled resource; and
provide the voice input to the active target voice enabled resource selected.

12. The electronic device of claim 11, wherein the active target voice enabled resource is selected from the group consisting of an active target voice enabled application and a voice enabled device associated with a voice enabled application.

13. The electronic device of claim 11, wherein the instructions are further executable by the processor to obtain additional input, wherein selecting an active target voice enabled resource comprises utilizing the additional input.

14. The electronic device of claim 13, wherein the additional input comprises eye tracking input.

15. The electronic device of claim 14, wherein the eye tracking input is associated with a predetermined area.

16. The electronic device of claim 15, further comprising a display device, wherein the predetermined area comprises a display area of the display device used by one of the plurality of active target voice enabled resources.

17. The electronic device of claim 16, wherein the display area includes a notification issued by the one of the plurality of active target voice enabled resources.

18. The electronic device of claim 13, wherein the additional input is selected from the group consisting of gesture input, touch input and voice input.

19. The electronic device of claim 11, wherein to select comprises analyzing one or more words of the voice input.

20. A program product, comprising:
a storage device that stores code executable by a processor, the code comprising:
code that receives, from an audio receiver of a device, a voice input;
code that selects an active target voice enabled resource for the voice input from among a plurality of active target voice enabled resources, wherein each of the plurality of active target voice enabled resources is associated with a voice enabled application and wherein the code that selects comprises using contextual data to determine the active target voice enabled resource; and
code that provides the voice input to the active target voice enabled resource selected.

* * * * *